United States Patent [19]
Hahn et al.

[11] Patent Number: 4,887,907
[45] Date of Patent: Dec. 19, 1989

[54] ROTARY EXTRUDER WITH INTERNALLY COOLED ROTOR

[75] Inventors: Granville J. Hahn; Sammy K. Flud, both of Big Spring, Tex.

[73] Assignee: Permian Research Corporation, Big Spring, Tex.

[21] Appl. No.: 347,152

[22] Filed: May 3, 1989

[51] Int. Cl.[4] ............................................. B01F 15/06
[52] U.S. Cl. ...................................... 366/99; 366/147; 425/378.1
[58] Field of Search ........................ 366/79, 97, 98, 99, 366/144, 145, 147, 22, 24; 925/378.1, 209, 205; 99/348

[56] References Cited
U.S. PATENT DOCUMENTS 3,285,330  11/1966  Root ..................................... 366/147
3,870,451   3/1975  Gokcen ............................ 425/378.1
4,734,240   3/1988  Chung ............................. 425/378.1

Primary Examiner—Robert W. Jenkins
Attorney, Agent, or Firm—Ross, Howison, Clapp & Korn

[57] ABSTRACT

A rotor assembly for use in a rotary extruder, comprising a rotor rotatably mounted inside a barrel by means of drive and free end bearing assemblies; a coaxial longitudinal bore extending into the rotor from its free end; a sleeve within the bore defining a thermally insulated central zone disposed radially inward from the plasticizing surface of the rotor, and cooling zones disposed at each end of the sleeve radially inward from the drive and free end bearing assemblies; a conduit disposed within the sleeve defining a longitudinally extending annulus therebetween; and rotatable means providing fluid communication between a coolant inlet and the interior of the conduit, and between the longitudinally extending annulus and a coolant outlet.

3 Claims, 3 Drawing Sheets

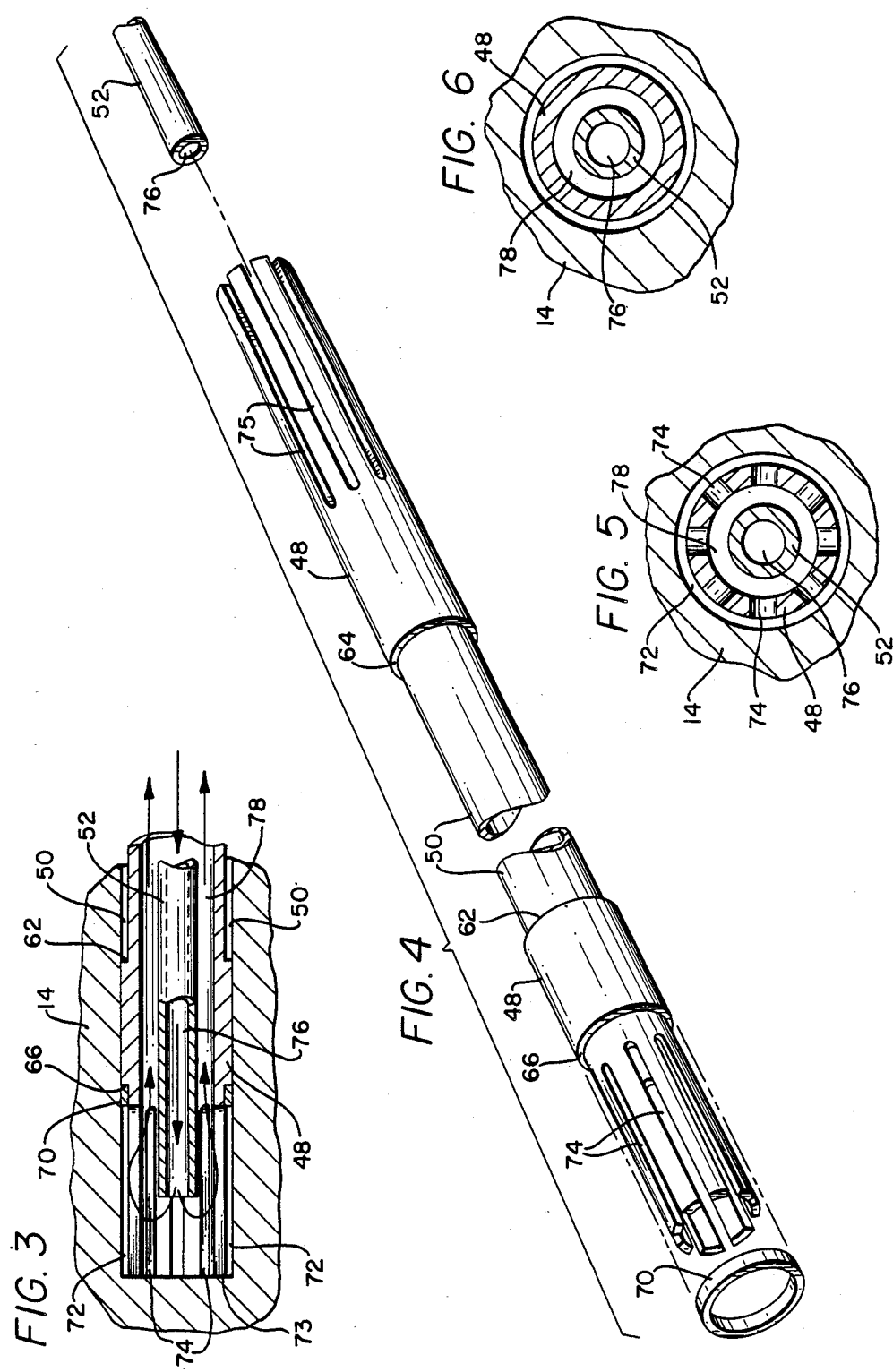

ROTARY EXTRUDER WITH INTERNALLY COOLED ROTOR

TECHNICAL FIELD

This invention relates to rotary extruders, and more particularly, to rotary extruders adapted for plasticizing polymeric resins

BACKGROUND OF THE INVENTION

As used herein, the term "rotary extruder" refers to an extruder having a barrel section with an eccentric bore and a rotor that comprises a substantially cylindrical plasticizing surface rotatably mounted within the bore. Polymeric resin, typically in the form of pellets, flakes or powder, is introduced into a clearance zone between the rotor and the interior surface of the barrel through a feed port. The resin is then plasticized and delivered to a discharge port as the rotor rotates within the stationary barrel. Extruders of this general type, which differ substantially from conventional rotating screw extruders, have previously been disclosed, for example, in U.S. Pat. Nos. 3,880,564; 4,012,477; 4,501,543; and 4,813,863.

Rotary extruders utilize bearings near each end of the rotor to reduce friction and the power required to rotate the rotor within the barrel. In the past, these bearing have been cooled by circulating water through the bearing housings. It is now believed that the operating temperature of the bearings can be reduced and bearing life increased by providing internal cooling to that section of the rotor with which the bearings make contact. In so doing, however, care must be taken to minimize any associated cooling of that portion of the rotor where polymeric resin is being plasticized.

Although the use of water cooling inside the feed section of a conventional extruder screw has been disclosed in U.S. Pat. No. 3,482,006 for the purpose of preventing additives from melting prematurely during the manufacture of thermoplastic foam, the teachings of that reference are contrary to the goal of not significantly reducing the temperature of the rotor surface adjacent to the feed zone.

Apparatus is therefore needed that will achieve the above-stated objectives within a rotary extruder.

SUMMARY OF THE INVENTION

According to the present invention, a rotary extruder is provided comprising means for internally cooling longitudinally spaced zones near the ends of the rotor without substantially cooling the intermediate portion of the rotor disposed therebetween.

According to a preferred embodiment of the invention, a rotor assembly for a rotary extruder is provided that comprises a centrally disposed, axial bore extending through the rotor from a point interior of the bearings at one end of the rotor to a point interior of the bearings at the opposite end of the rotor. A cylindrical sleeve substantially the same length as the bore, having a maximum outside diameter slightly less than the interior diameter of the bore and an inside diameter sufficient to accommodate the desired coolant flow, is pressed into closely contacting, coaxial alignment within the bore. The outside diameter of the sleeve is preferably reduced in a centrally disposed section corresponding to and disposed radially inward from that part of the rotor surface that contacts polymeric resin during operation of the extruder. Circumferentially spaced apertures are preferably provided at each end of the sleeve to permit coolant to contact adjacent sections of the rotor bore. A cylindrical conduit having an outside diameter sufficiently less than that of the inside diameter of the sleeve to accommodate the desired coolant flow, and an inside diameter sufficient to accommodate the desired coolant flow, is coaxially disposed within the sleeve.

Rotary unions are desirably provided to permit coolant to be introduced into the rotor through the conduit and removed from the rotor through the annulus between the conduit and the sleeve. Alternatively, coolant can be introduced into the rotor through the annulus between the conduit and the sleeve, and removed from the rotor through the conduit.

When the apparatus of the invention is constructed as disclosed herein, an annulus is also defined along the centrally disposed section of the rotor that serves an insulating gap between the surface of the rotor bore and the outside surface of the sleeve.

BRIEF DESCRIPTION OF DRAWINGS

The apparatus of the invention is further described and explained in relation to the following figures wherein:

FIG. 3 is a detail view of the left end of the rotor bore/sleeve/conduit assembly as shown in FIG. 2, with streamlines depicting the direction of coolant flow;

FIG. 4 is an exploded perspective view of the sleeve/conduit assembly of the invention as depicted apart from the rotary extruder;

FIG. 5 is a sectional detail view taken along line 5—5 of FIG. 2; and

FIG. 6 is a sectional detail view taken along line 6—6 of FIG. 2.

Like numerals are used to indicate like parts in all figures of the drawings.

DETAILED DESCRIPTION OF THE INVENTION

Figure 1:
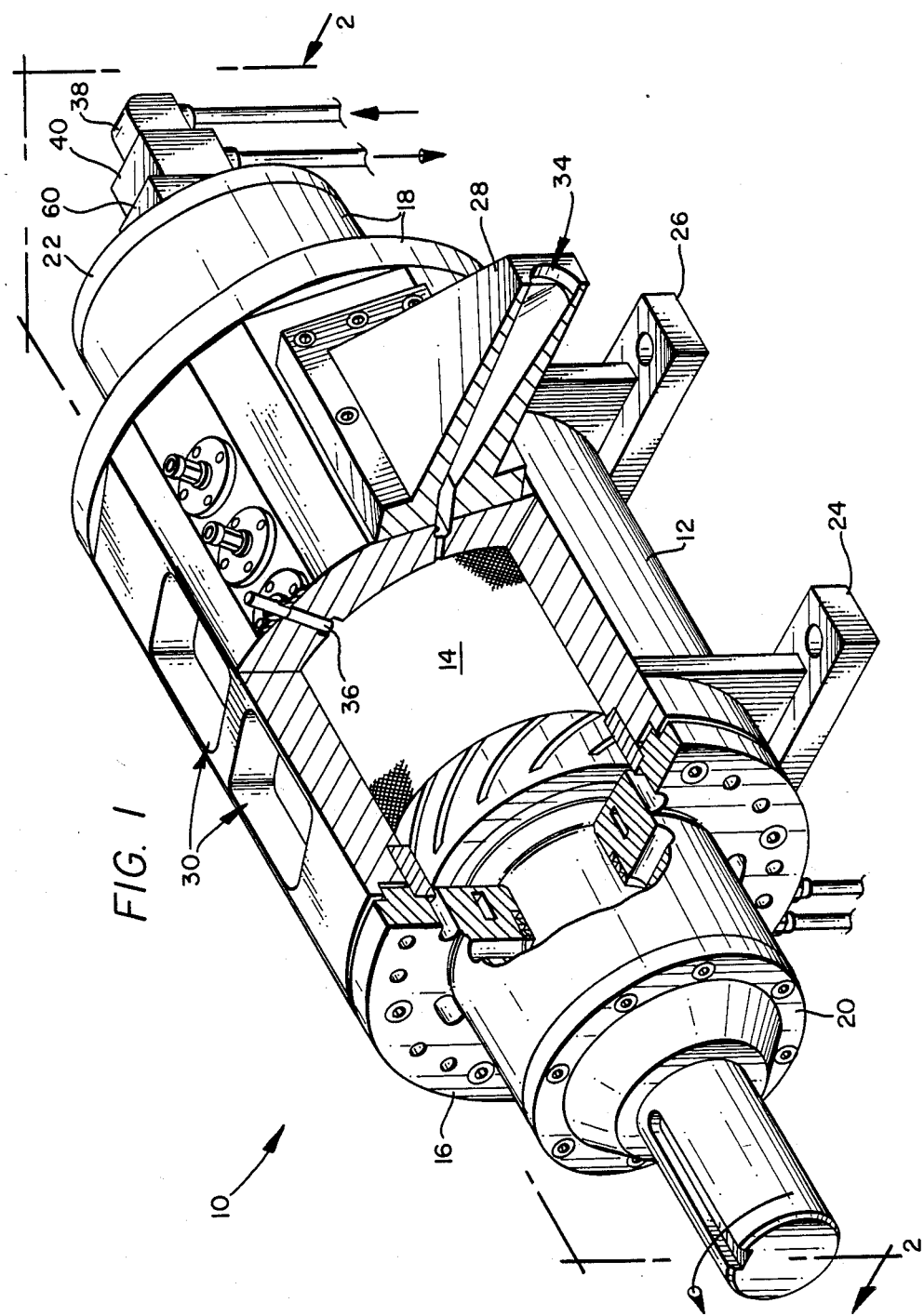
FIG. 1 is a perspective view of a rotary extruder that is partially broken away to reveal the outer surface of the rotor that is rotatably mounted therein.
Figure 2:
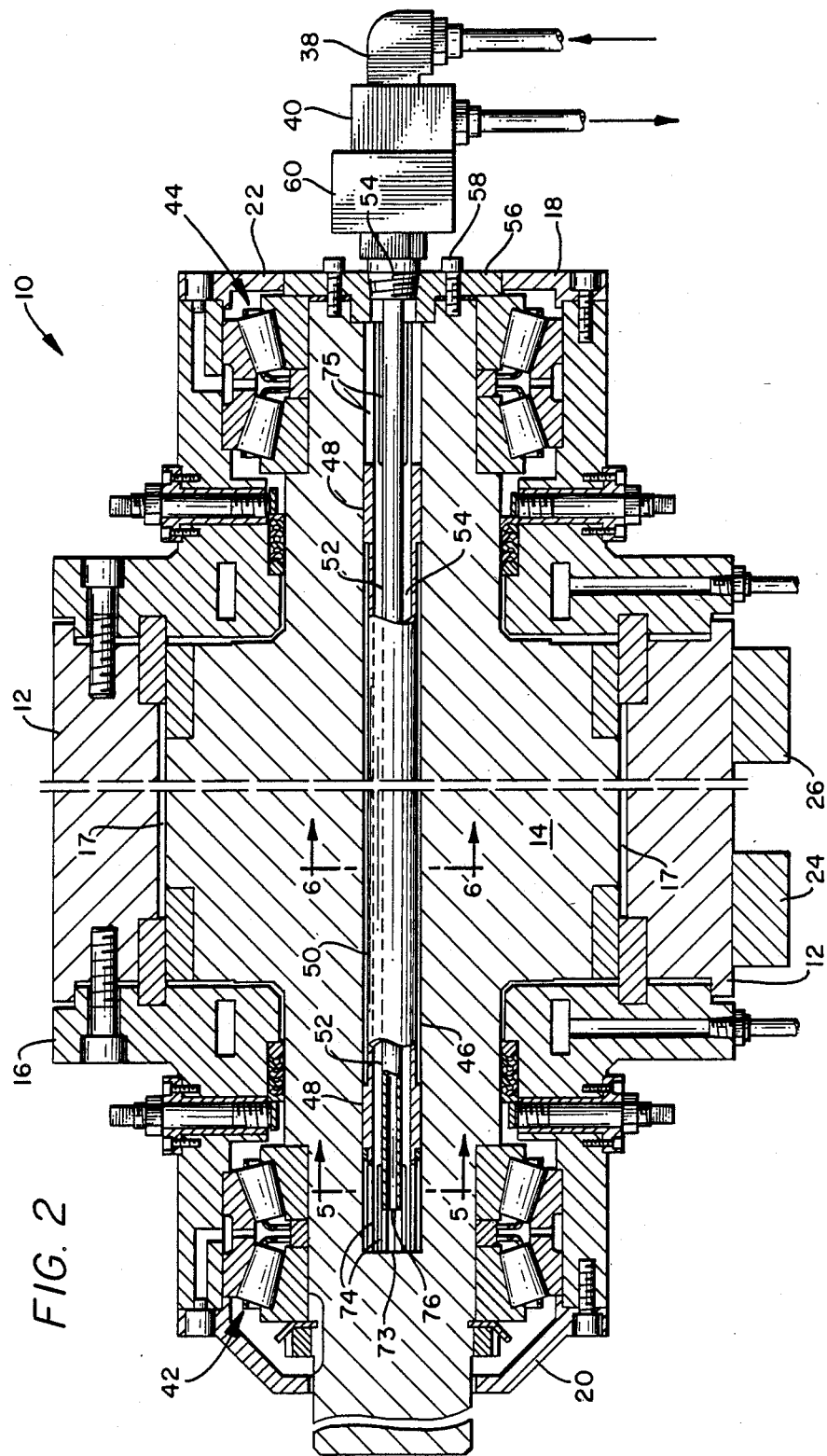
FIG. 2 is a cross-sectional view taken along line 2—2 of FIG. 1.

Referring to FIGS. 1 and 2, rotary extruder 10 preferably comprises substantially cylindrical barrel 12 having rotor 14 rotatably mounted therein. Rotor 14 is supported within barrel 12 by bearings disposed inside drive end plate 16 and free end plate 18, and are maintained there by drive end retainer 20 and free end retainer 22, respectively. Barrel 12 is secured to a supporting surface by mounting legs 24, 26. Rotary extruder 10 further comprises inlet ports 30 in barrel 12 through which the feed material is introduced into the extruder, and discharge port 34 in discharge manifold 28 through which the plasticized extrudate exits the extruder. Adjustable restrictor bar assembly 36 controls the amount of plasticized material that is carried back past the inlet ports 30 during each rotation of rotor 14 within barrel 12.

Referring to FIGS. 1 through 6, apparatus is disclosed for internally cooling those sections of rotor 14 that are disposed radially inward from bearing assemblies 42, 44. Whenever polymeric resin is being plasticized in annulus 17 between barrel 12 and rotor 14, bearing assemblies 42, 44 are subjected to significant heat and pressure. By cooling those portions of rotor 14 that are nearest to bearing assemblies 42, 44, it is believed that bearing life can be enhanced and the power required to rotate rotor 14 within barrel 12 can be reduced. In so doing, however, it is important that the portion of rotor 14 adjacent to annulus 17 be protected from excessive heat loss that would be detrimental to the objective of plasticizing the resin or would cause the plasticized resin to harden on the surface of the rotor.

According to the present invention, apparatus is provided for cooling the ends of rotor 14 adjacent bearing assemblies 42, 44, while minimizing cooling to those portions of rotor 14 disposed therebetween. The cooled rotor of the invention preferably comprises a longitudinal bore 46 that extends coaxially through the center of rotor 14 from its free end (opposite the drive end), near free end bearing assembly 44, to end wall 73, disposed radially inward from drive end bearing assembly 42.

Sleeve 48 is preferably made of stainless steel, has a maximum outside diameter slightly smaller than the diameter of bore 46, and is substantially the same length as bore 46. Sleeve 48 preferably further comprises spaced apart sections at the free end of sleeve 48 and in the central portion of sleeve 48 where the outside diameter has been reduced by machining or the like. Shoulders 62, 64 as shown in detail in FIG. 4 define the longitudinal limits of the central portion of sleeve 48 where the outside diameter has been reduced. Shoulder 66 defines the beginning of the reduced outside diameter portion at the drive end of sleeve 48, which continues from shoulder 66 to the end of the sleeve. Shoulder 66 cooperates with bore end wall 73 to define annular space 72 between bore 46 and sleeve 48. Shoulders 62, 64 cooperate with bore 46 and the centrally disposed, reduced diameter portion of sleeve 48 to define annular void 50.

The end of sleeve 48 near the free end of rotor 14 comprises slots 75, which permit the coolant circulated through sleeve 48 to contact alternating sections of the wall of bore 46 that are inwardly disposed from free end bearing assembly 44. The diameter of sleeve 48 is not reduced to form an annular space around sleeve 48 adjacent to slots 75, because slots 75 are longer than slots 74, and the total heat transfer at the drive end of bore 46, with annulus 72 adjacent to slots 74, is substantially the same as the heat transfer at the free end of bore 46 without an annulus. Although the slot configuration shown for sleeve 48 in FIGS. 2, 3 and 4 is utilized in a preferred embodiment of the invention, it is understood that similarly effective results can be achieved with other sleeve configurations.

Thus, for example, one might reduce the diameter at the end of sleeve 48 near the free end of rotor 14 as for the opposite end, thereby creating an annular space analogous to space 72, while simultaneously shortening slots 75 to maintain the same heat transfer. Alternatively, bore 46 and sleeve 48 can be extended further into rotor 14, so that bore 46 extends completely under bearing assembly 42, thereby enabling slots 74 to be lengthened and annular space 72 to be eliminated. With the latter configuration, however, the drive end of rotor 14 could be weakened undesirably by lengthening bore 46.

The diameter of bore 46 and the extent to which the outside diameter of sleeve 48 is reduced to create annular space and annular void 50 can vary, depending upon the diameter of rotor 14, the amount of heat to be removed by coolant circulating through bore 46, the wall thickness of sleeve 48, and the like. It will also be apparent that apertures through sleeve 48 having geometrical configurations other than slots can be similarly effective for circulating coolant through bore 46 and removing heat from adjacent sections of rotor 14.

Brass ring 70 is desirably fitted over sleeve 48 in abutting relation to shoulder 66. Because the brass ring has a higher thermal expansion coefficient than sleeve 48, it will assist in preventing coolant from passing between the larger diameter section of sleeve 48 and the wall of bore 46 into annular void 50. It is desired that annular void 50 be maintained as a dead air space to assist in thermally insulating the centrally disposed portion of sleeve 48 from the opposing wall of bore 46 of rotor 14. After brass ring 70 is fitted over the drive end of sleeve 48, sleeve 48 is preferably press-fitted into bore 46.

Cylindrical conduit 52 is preferably made of steel pipe. The inside diameter of conduit 52 should be sufficient to accommodate the desired coolant flow, and the outside diameter of conduit 52 should be such that the resultant annular space between sleeve 48 and conduit 52 is large enough to accommodate the same flow.

Cylindrical conduit 52, slightly shorter than bore 46, is preferably disposed within sleeve 48 to define annulus 78 therebetween. Cylindrical conduit 52 is preferably maintained in concentric alignment with sleeve 48 and bore 46 by collar 54, which threadedly engages a concentric bore in retainer ring 56. Retainer ring 56 is in turn secured in fixed relation to rotor 14 by bolts 58.

Rotatable union 60 provides fluid communication between coolant inlet 38 and interior passage 76 of conduit 52, and between annular passage 78 and coolant outlet 40, as rotor 14 is rotated by a drive means (not shown) within barrel 12. The streamline arrows shown in FIG. 3 depict general direction of coolant flow out of conduit 52, through slots 74 into annular space 72, and back into annulus 78.

Other alterations and modifications of the subject invention will become obvious to those of ordinary skill int he art upon reading this disclosure, and it is intended that the present invention be limited only by the broadest interpretation of the appended claims to which the inventors may be legally entitled.

We claim:

1. An internally cooled rotor for a rotary extruder, said rotor comprising means at each end thereof for rotatably mounting said rotor in said extruder and a substantially cylindrical plasticizing section disposed therebetween, said rotor further comprising: an axial bore extending substantially through said rotor, said bore defined by a substantially cylindrical wall; a sleeve disposed within said bore; a conduit disposed within said sleeve; a first annulus between said conduit and said sleeve; a second annulus disposed between said sleeve and said wall, said second annulus being disposed radially inward from said plasticizing section and the length of said second annulus being substantially coextensive with the length of said plasticizing section; means for providing fluid communication between said conduit and said first annulus; means for selectively introducing and discharging a coolant through said conduit and said first annulus; and means adjacent each end of said sleeve for contacting coolant circulated through said conduit and said first annulus with said wall of said bore.

2. A rotary extruder comprising a barrel having an eccentric bore and a rotor rotatably mounted within said bore, said rotor comprising a substantially cylindrical outer surface section adapted to coact with said eccentric bore of said barrel to plasticize polymeric resin introduced therebetween wherever said rotor is rotated within said barrel, said rotor further comprising: a centrally disposed, axially extending internal bore bounded by an interiorly facing surface of said rotor; a sleeve coaxially disposed within said bore; a conduit coaxially disposed within said sleeve; a first longitudinally extending annulus between said conduit and said first annulus; and means for selectively introducing and discharging a coolant through said conduit and said first annulus while said rotor is rotating within said barrel; said sleeve further comprising circumferentially spaced means enabling said coolant to contact at least a portion of said interiorly facing surface near each end thereof; and a second longitudinally extending annulus between said sleeve and said interiorly facing surface, said second annulus being adapted to provide an air gap between that portion of said interiorly facing surface disposed radially inward from said outer surface section of said rotor and that portion of said sleeve disposed radially inward thereof 3. A rotor assembly for use in a rotary extruder, said assembly comprising: a rotor rotatably mounted inside a barrel by means of drive and free end bearing assemblies, said rotor comprising a substantially cylindrical outer surface section adapted to coact with said barrel to plasticize polymeric resin introduced therebetween whenever said rotor is rotated within said barrel; a coaxial longitudinal bore extending into the rotor from its free end; a sleeve within the bore defining a thermally insulated central zone disposed radially inward from the plasticizing surface of said rotor; and cooling zones disposed at each end of the sleeve radially inward from the drive and free end bearing assemblies; a conduit disposed within the sleeve defining a longitudinally extending annulus therebetween; and rotatable means providing fluid communication between a coolant inlet and the interior of the conduit, and between the longitudinally extending annulus and a coolant outlet.

* * * * *